March 27, 1956 — W. L. MARTIN ET AL — 2,739,346
MACHINE FOR PULLING LEG TENDONS
Filed Nov. 1, 1952 — 3 Sheets-Sheet 1
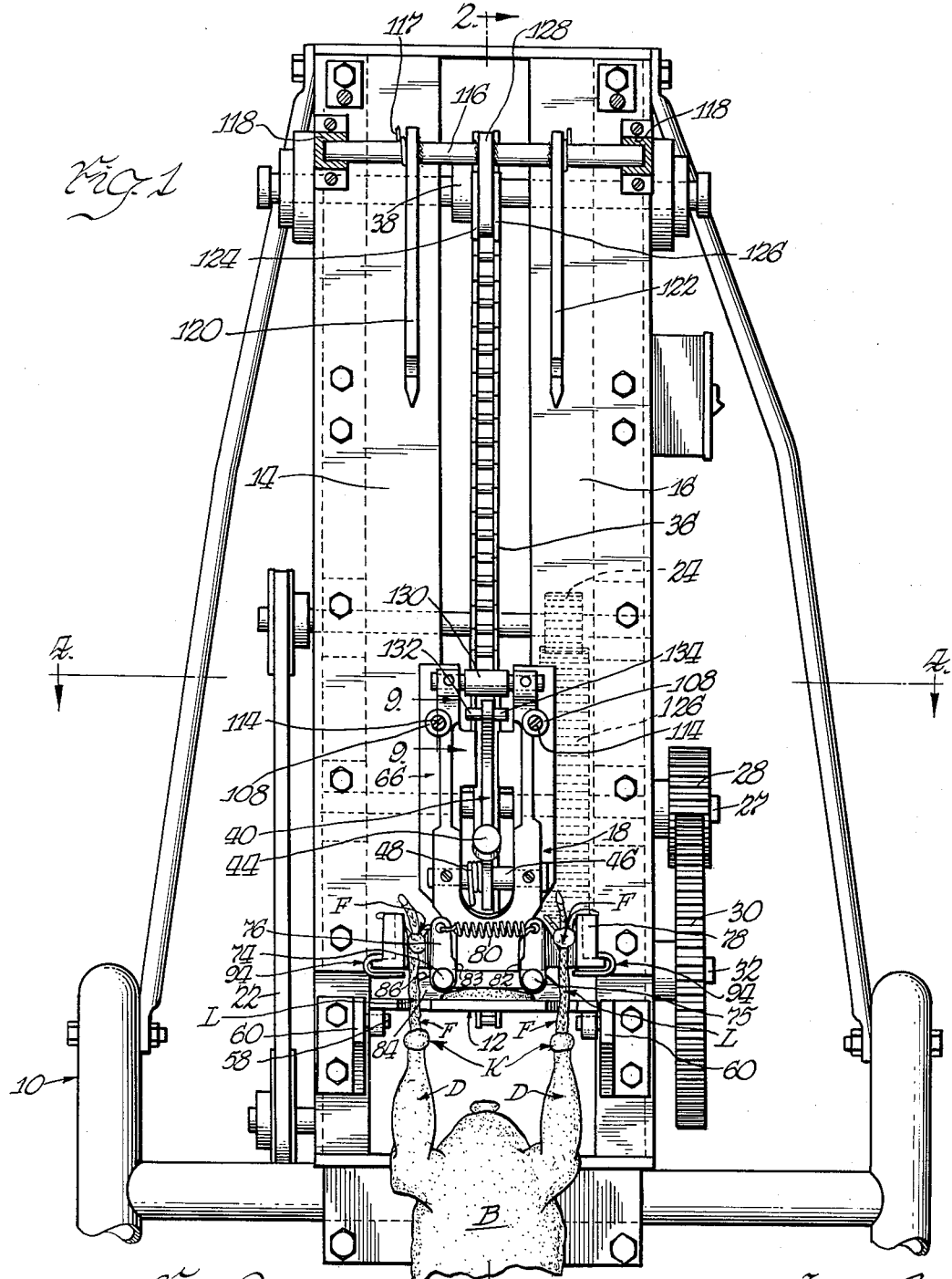
Inventors
William Leo Martin
George Ray Shadley
By Bair, Freeman & Molinare
Attys.

March 27, 1956 — W. L. MARTIN ET AL — 2,739,346
MACHINE FOR PULLING LEG TENDONS
Filed Nov. 1, 1952 — 3 Sheets-Sheet 2
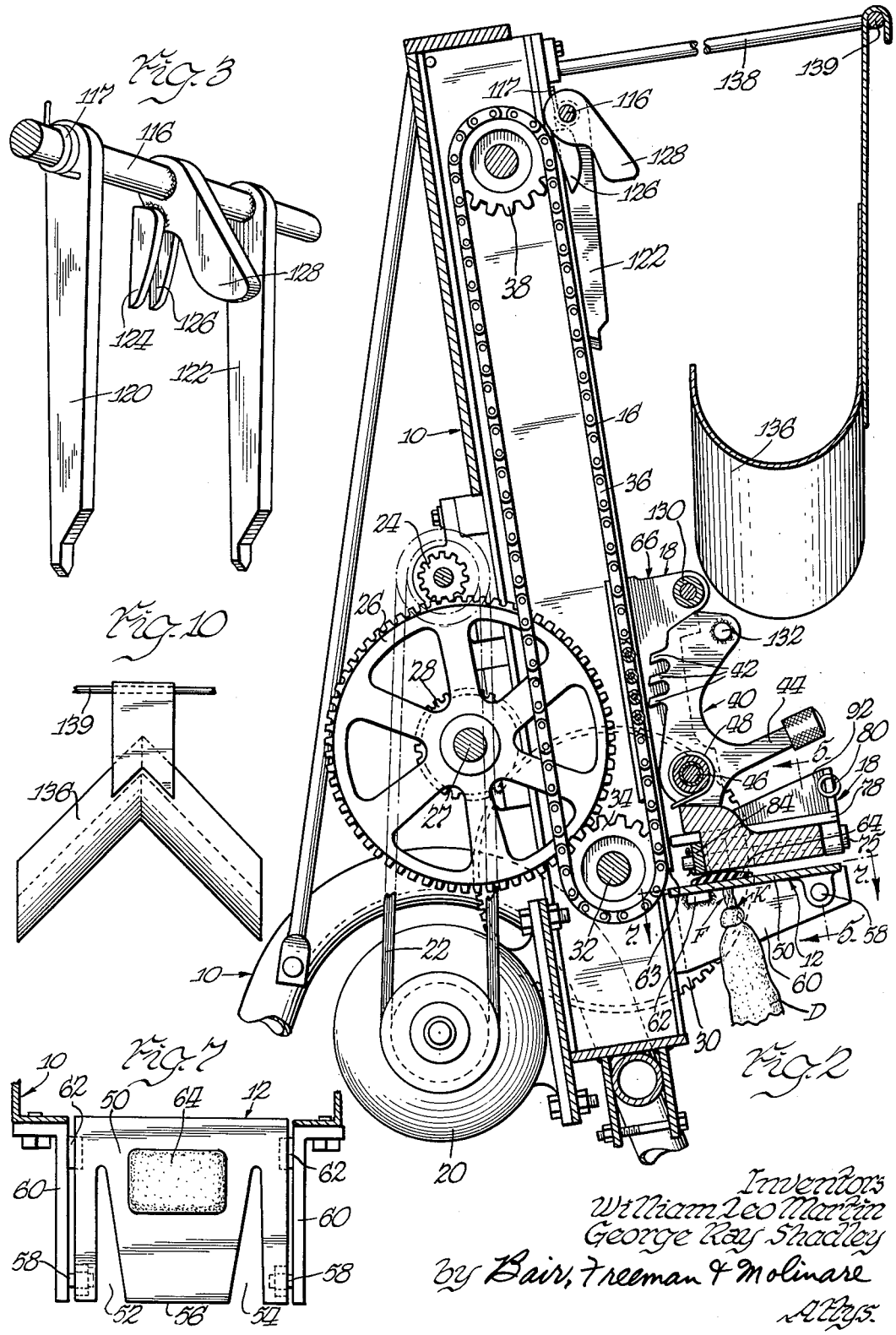
Inventors
William Leo Martin
George Ray Shadley
by Bair, Freeman & Molinare
Attys.

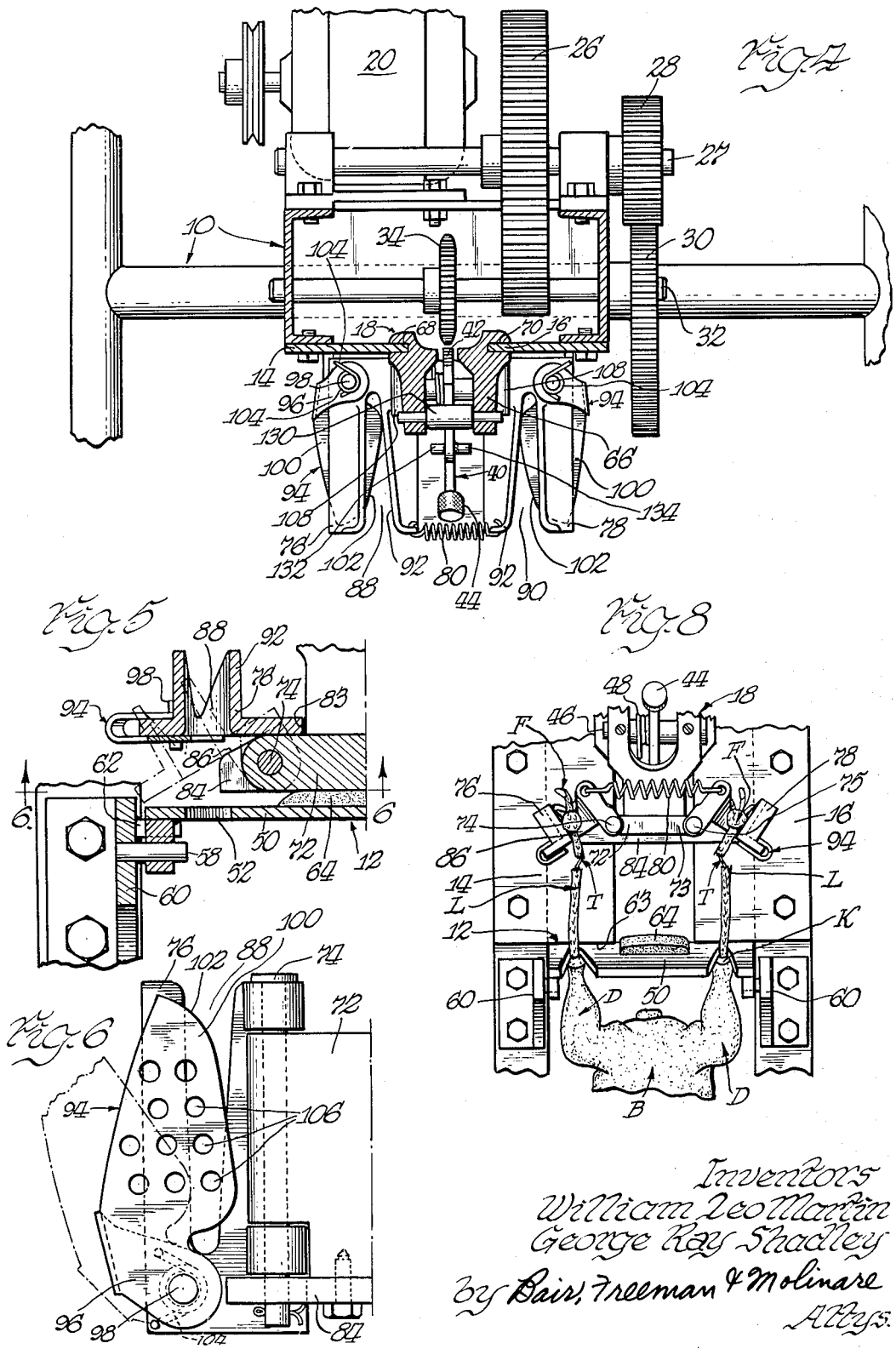

United States Patent Office 2,739,346
Patented Mar. 27, 1956

2,739,346

MACHINE FOR PULLING LEG TENDONS

William Leo Martin and George Ray Shadley, Ottumwa, Iowa

Application November 1, 1952, Serial No. 318,274

11 Claims. (Cl. 17—11.3)

This invention relates to a poultry processing machine and more particularly to a machine for pulling the leg tendons of fowl.

The leg tendons of poultry, particularly large fowl such as turkeys, are very tough, stringy and generally considered inedible. In dressing turkeys for the market, it would be desirable to remove the leg tendons without damaging the appearance of the drumstick, or the fleshy portion of the leg. These tendons are secured at one end to the claw or foot portion of the fowl and then run upwardly along the bony leg and enter at the knee joint into the drumstick, or fleshy portion of the leg. The bony leg of the fowl is not a particularly desirable portion. If this member is broken and severed, and if the foot is pulled away from the rest of the fowl, the tendons will accompany the foot and remain attached thereto.

Thus one of the objects of this invention is to provide a machine for pulling the leg tendons of poultry.

Another object of this invention is to provide a poultry processing machine which breaks the leg of the fowl and separates the foot from the remainder of the fowl and pulls the leg tendons from the drumsticks.

A further object of this invention is to provide a machine for pulling leg tendons of poultry, which machine has means for automatically discharging from said machine the portions of the legs that have been severed from the fowl and also means for discharging the fowl itself from the machine.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a front elevation of a machine for pulling the leg tendons of fowl;

Figure 2 is a cross-section view taken on line 2—2 of Figure 1;

Figure 3 is a perspective view of the member for declutching the carriage of the tendon puller and for automatically discharging the portions of the legs carried by the carriage;

Figure 4 is a cross-section view taken on line 4—4 of Figure 1;

Figure 5 is an enlarged fragmentary view of the carriage taken on line 5—5 of Figure 2;

Figure 6 is a view taken on line 6—6 of Figure 5;

Figure 7 is an enlarged view taken on line 7—7 of Figure 2;

Figure 8 is a view similar to a portion of Figure 1 illustrating the relative location of parts when the legs of the fowl are broken;

Figure 9 is an enlarged cross-section view taken on line 9—9 of Figure 1; and

Figure 10 is a reduced elevation view of the chute for receiving the portions of the legs discharged from the carriage.

In the drawings, the body of a fowl is indicated at B, the drumstick at D, the knee at K, the leg at L, the tendons at T, and the foot at F. The leg extends between the knee and the foot.

Referring now to the drawings, the tendon pulling machine shown in Figure 1 includes a framework generally indicated at 10 and has an anchoring member or anchor 12 mounted thereon. The framework includes a pair of upwardly extending spaced tracks 14 and 16. A carriage 18 is positioned to move along the length of tracks 14 and 16 upwardly from adjacent anchor 12.

The driving means for the tendon puller includes a motor 20 mounted on framework 10, a belt 22 driven by motor 20, and a gear train which reduces the output speed and is driven by said belt 22. The gear train includes pinion 24 which drives large gear 26 which in turn drives small gear 28 through the medium of shaft 27, upon which both gears 26 and 28 are mounted. The gear 28 further drives a large gear 30 upon a shaft 32, upon which a sprocket 34 is mounted. A chain 36 is trained over sprocket 34 and an idling sprocket 38.

The carriage 18 is provided with a clutch for attachment to chain 36. This clutch 40 is provided with teeth 42 adapted to mesh with the links of chain 36. Clutch 40 is provided with a handle 44 and is pivotally mounted on a shaft 46. A spring 48, concentrically mounted on shaft 46, cooperates with clutch 40 to bias it toward the position shown in Figure 2.

Referring now to anchor 12, said anchor comprises a plate 50 having a pair of V-shaped slots or recesses 52 and 54, extending inwardly from edge 56 of the plate 50. Said anchor 12 is pivotally mounted on pins 58 which extend from flanges 60 on framework 10, and which pins are located adjacent said edge 56 of plate 50. Stop means 62 are provided on flanges 60 and are adapted to engage the lower side of plate 50 to limit the downward movement of anchor 12. The anchor 12 is also adapted to engage portion 63 of framework 10 to limit its upward movement. Plate 50 also carries a resilient pad 64 which is adapted to engage the underside of carriage 18.

Referring to carriage 18, said carriage comprises a casting 66 having grooves 68 and 70 therein for tracks 14 and 16. Casting 66 carries shaft 46 upon which is pivoted the clutch 40. The lower portion of casting 66 has a pair of ears 72 and 73 bored to receive rock shafts 74 and 75. Mounted on rock shafts 74 and 75 are a pair of leg holders 76 and 78. The leg holders 76 and 78 are pivotally mounted and are biased toward each other by spring 80. Movement of the leg holders toward each other is limited by engagement of portions of the leg holders 76 and 78 with portions of casting 66, as indicated in Figure 5 at 82 and 83. Secured to the backside of casting 66 is a plate 84 having a formed edge 86 adapted to be engaged by the foot holders 76 and 78. Plate 84 serves to limit the pivoting of said leg holders 76 and 78 to the extreme positions shown in the dot and dash lines of Figure 5. The limiting angle of pivot of leg holders 76 and 78 is defined by the slope of edge 86.

Referring now to the leg holders 76 and 78, said leg holders are provided with V-slots or recesses 88 and 90 therein. Each leg holder has vertical walls 92 extending along the edge of the V-slot, said walls 92 tapering from their greatest height at the forward portion of the slot down to their least height at the narrowest portion of the slot. Each leg holder has a sheet metal plate 94 mounted thereon. Plate 94 has a U-shaped mounting portion 96 which is pivoted on pin 98, carried by the foot holder, and each plate 94 has a flap portion 100 adapted to be swung to cover and uncover the V-shaped recess in the foot holder. The flap 100 of each plate 94 is positioned on the side of the carriage adjacent anchor 12.

Flap 100 has a tapered or curved edge 102 against which the leg of the fowl is pressed to pivot the leg holders to the dot and dash position shown in Figure 6. Spring 104 on pin 98 operates to bias the plate 94 to the full line position shown in Figure 6. The underside of flap 100 is provided with non-slip means, such as holes 106, for a reason hereinafter described.

Still referring to carriage 18, after the carriage 18 has been moved by chain 36 far enough upward along tracks 14 and 16 and away from anchor 12 to effect the pulling of the tendons of the fowl, the clutch 40 is disconnected from the chain 36 and the carriage 18 falls back to its original position adjacent the anchor 12. Carriage 18 is rather heavy and it is desirable to slow the descent thereof. Accordingly, means for retarding the rate of the fall of carriage 18 is provided.

Casting 66 has a pair of bored and tapped bosses 108, Figure 9, within each of which is assembled means for retarding the rate of fall of said carriage. These means include frictional retarders 110 made of brass or the like which are biased into engagement with tracks 14 and 16 by means of springs 112. The retarders 110 and springs 112 are retained in the bore in boss 108 by cap screws 114 which are also used to vary the resilient force being applied to retarders 110. The resilient pad 64 on anchor 12 is also operative to absorb some of the impact of carriage 18 as it returns to its original position adjacent the anchor 12.

After the tendons of the fowl have been pulled, it is only necessary to discharge the severed portions of the legs and the tendons from the carriage and to return carriage 18 to its original position adjacent anchor 12 and discharge the body of the fowl from the anchor 12 to put the machine in condition to receive the next fowl. To accomplish these ends, the following described mechanism is provided.

A shaft 116 is pivotally mounted in bearing blocks 118 adjacent the upper ends of tracks 14 and 16 and is normally retained against tracks 14 and 16 by means of spring 117, as shown in Figure 2. Mounted on shaft 116 and pivotable therewith are a pair of leg kick-out or discharging members 120 and 122, a pair of clutch releasing cams 124 and 126, and a shaft operating cam 128. The casting 66 of carriage 18 carries a cam follower 130 adapted to engage the shaft operating cam 128. Clutch 40 carries a pair of pins 132 and 134 adapted, respectively, to be engaged by the clutch releasing cams 124 and 126 so as to cause the clutch teeth 42 to be disengaged from chain 36, whereby the carriage 18 is disconnected from chain 36. After carriage 18 is disconnected from chain 36 it falls back to its original position adjacent the anchor 12.

As the carriage 18 moves up along the tracks 14 and 16 the cam follower 130 engages the cam 128. Further upward movement of cam follower 130 causes the shaft 116 to be pivoted so that clutch releasing cams 124 and 126, and foot discharging members 120 and 122 are swung outwardly away from tracks 14 and 16. The relationship of parts is such that when the clutch releasing cams 124 and 126 are swung outwardly, they engage pins 132 and 134 and cause the disconnection of clutch teeth 42 from chain 36. Simultaneously, the lower ends of discharging members 120 and 122, respectively, enter V-slots 88 and 90 and are operative to kick out the severed portions of the legs and the tendons from the V-slots. A sheet metal chute 136 is provided to receive the discharged legs and tendons and to direct them laterally of the machine. The chute 136 is mounted in any appropriate manner in framework 10, such as by means of rods 138 and 139 welded thereto, and said chute is mounted out of the path of movement of the carriage 18.

After the legs and the tendons are discharged from the leg holders 76 and 78, the flaps 100 are caused by means of springs 104 to assume the positions of overlapping the V-slots 88 and 90 as shown in full lines in Figure 6. When the carriage 18 is returned to its original position adjacent the anchor 12, these flaps 100 engage the portions of the legs of the fowl in slots 52 and 54 which project above the anchor 12. The carriage 18, through flaps 100, applies downward axial forces on the legs of the fowl so as to discharge the body of the fowl from the anchor 12. The holes 106 provide flaps 100 with a non-skid surface so that the portions of the fowl leg engaged by flap 100 will be pushed out of anchor 12 and not just skid off to one side of the flap. After the body of the fowl is discharged from anchor 12, the machine is ready to receive the next fowl.

In operation, carriage 18 and anchor 12 are normally in the position shown in Figures 1 and 2. The legs of the fowl are thrust into the registering V-slots of the leg holders and anchor with the feet of the fowl above the leg holders 76 and 78, and the body of the fowl below anchor 12. As the legs are thrust into leg holders 76 and 78 they displace sheet metal plates 94 to the dot and dash position shown in Figure 6.

After the fowl is positioned as shown in Figures 1 and 2, the handle 44 of the clutch 40 is grasped and swung upwardly until clutch teeth 42 mesh with chain 36 whereupon carriage 18 starts to move upwardly with chain 36 away from anchor 12. As the portion of the legs adjacent the knee joints engages the bottom of the anchor plate 50, anchor 12 is pivoted upwardly about pins 58 from adjacent stop 62 until anchor plate 50 engages stop 63. This causes the portions of the fowl legs to jam firmly into the inner ends of the V-slots 52 and 54. There is relatively little movement of anchor 12 but it is sufficient to cause the legs to jam securely into the V-slots 52 and 54.

As the carriage 18 continues upwardly, the foot of the fowl becomes more firmly jammed in the inner ends of V-slots 88 and 90 in the leg holders 76 and 78. Further upward movement causes legs holders 76 and 78 to pivot away from each other about shafts 74 and 75. The movement of the leg holders 76 and 78 relative to the V-slots in anchor 12 is operative to break and sever the relatively brittle bony portions of the legs between the feet and the knee joints. Thereafter, further upward movement of the carriage 18 is operative to separate the feet and severed portions of the legs from the body of the fowl and to pull the tendons from the fleshy portion of the fowl legs. It is to be noted that the anchor 12 is pivotable about an axis which extends transverse to the direction of movement of carriage 18 and the leg holders 76 and 78 are pivotable about axes which extend transverse to the direction of motion of the carriage 18 and also transverse to the axis about which the anchor 12 pivots.

When carriage 18 has moved up far enough so that the tendons are completely pulled, the cam follower 130 engages cam 128 and operates shaft 116 and the members thereon to cause declutching of the carriage 18 from the chain 36 and the discharge of the feet and the tendons from the foot holders 76 and 78.

Upon being declutched, carriage 18 falls back to the original position adjacent the anchor 12 and at the same time is operative through flaps 100 to discharge the body of the fowl from the anchor 12, and the machine is ready for the next fowl.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. A machine for pulling leg tendons of fowl comprising an anchoring member, a slidably mounted carriage reciprocable toward and away from said anchoring member, said anchoring member adapted to have the body of the fowl anchored thereto relative to said carriage, means on said carriage for receiving and grasping the legs of a fowl, means operatively associated with said carriage for moving said carriage away from said anchoring member, whereby portions of the legs are severed from the fowl and the leg tendons of the fowl are pulled from the fowl, means adapted to be engaged by the moving carriage and operated by said carriage for discharging the severed portions of the legs and tendons from the carriage after the tendons have been pulled, means operatively associated with said carriage for returning the carriage to a position adjacent the anchoring member after said portions of the legs and tendons have been discharged, and means including said carriage for discharging the body of the fowl from the anchoring member.

2. A machine as set forth in claim 1, including chute means positioned adjacent a portion of the run of the carriage for receiving said severed portions of the legs and tendons after they are discharged from the carriage.

3. A machine as set forth in claim 1, wherein gravity is operative to return the carriage to adjacent the anchoring member and including friction means operatively associated with said carriage for governing the speed of the return of the carriage to adjacent the anchoring member.

4. A machine for pulling leg tendons of fowl comprising an anchoring member, a carriage movable toward and away from said anchoring member, said anchoring member adapted to have the body of the fowl anchored thereto relative to said carriage, means on said carriage for receiving and grasping the legs of a fowl, a moving endless member, a selectively operable clutch on said carriage adapted to be engaged with said moving endless member, whereby said carriage is moved away from said anchoring member, means including said moving carriage for severing the legs of the fowl at points between the feet and the knees of the fowl, whereby the severed portions of the legs and the leg tendons of the fowl are pulled from the fowl, means positioned along the run of the moving conveyor and operatively associated with said carriage for simultaneously declutching the carriage from the moving endless member and for discharging the severed portions of the legs and the tendons from the carriage, and means operatively associated with said carriage for returning the carriage to adjacent the anchoring member after said severed portions of the legs and the tendons have been discharged, and means including said carriage for discharging the body of the fowl from the anchoring member.

5. A machine for pulling leg tendons of fowl comprising an anchoring member, a carriage movable toward and away from said anchoring member, said anchoring member adapted to have the body of the fowl anchored thereto relative to said carriage, said anchoring member and carriage having aligned recesses adapted to receive the legs of a fowl with the feet positioned to one side of the carriage and the body of the fowl positioned on the opposite side of the anchoring member, means on said carriage for grasping the legs, means operatively associated with said carriage for moving said carriage away from said anchoring member, whereby portions of the legs are severed from the fowl and the leg tendons of the fowl are pulled from the fowl, flaps on the side of said carriage adjacent the anchoring member swingable to positions to cover and uncover said recesses on the carriage, resilient means biasing said flaps to cover the recesses, means operatively associated with said carriage for discharging the severed portions of the legs and the tendons from the carriage after they have been pulled, means operatively associated with said carriage for returning the carriage to a position adjacent the anchoring member after the severed portions of the legs and the tendons have been discharged from the carriage, and means including said flaps for discharging the body of the fowl from the anchoring member upon the return of the carriage adjacent said anchoring member.

6. A machine for pulling leg tendons of fowls comprising a pivotally mounted anchoring member, a slidably mounted carriage normally positioned adjacent said anchoring member and reciprocable away from and toward said anchoring member, said anchoring member adapted to have the body of the fowl anchored thereto, said carriage having a pair of leg holders pivotally mounted thereon, said leg holders and anchoring member having slots therein adapted to be aligned and to receive the legs of a fowl with the feet positioned to one side of the carriage and the body of the fowl positioned on the opposite side of the anchoring member, means including said pivotable leg holders and pivotable anchoring member for breaking and severing the feet of the fowl at a point between the feet and the knee joints, and means operatively associated with said carriage for moving said carriage away from said anchoring member, whereby the leg tendons of the fowl are pulled from the fowl.

7. A machine for pulling leg tendons of fowls comprising an anchoring member, a carriage normally positioned adjacent said anchoring member and movable away from and toward said anchoring member, said anchoring member adapted to have the body of the fowl anchored thereto relative to said carriage, said carriage having a pair of leg holders pivotally mounted thereon, said leg holders and anchoring member having slots therein adapted to be aligned and to receive the legs of a fowl with the feet positioned to one side of the carriage and the body of the fowl positioned on the opposite side of the anchoring member, flaps on each leg holder positioned on the side of the carriage adjacent the anchoring member and swingable to positions to cover and uncover the slots in said leg holders, resilient means biasing said flaps to cover said leg holder slots, means operatively associated with said carriage for moving said carriage away from said anchoring member, whereby portions of the legs are severed from the fowl and the leg tendons of the fowl are pulled from the fowl, means for discharging the severed portions of the legs and the tendons from the leg holders after the tendons have been pulled, means operatively associated with said carriage for returning the carriage to adjacent the anchoring member after said severed portions of the legs and the tendons have been discharged, and means including said flaps for discharging the body of the fowl from the anchoring member.

8. A machine for pulling leg tendons of fowls comprising an anchoring member, a carriage normally positioned adjacent said anchoring member and movable away from and toward said anchoring member, said anchoring member adapted to have the body of the fowl anchored thereto relative to said carriage, said carriage having a pair of leg holders pivotally mounted thereon, said leg holders and anchoring member having slots therein adapted to be aligned and to receive the legs of a fowl with the feet positioned to one side of the carriage and the body of the fowl positioned on the opposite side of the anchoring member, said anchoring member being mounted to pivot about an axis transverse to the direction of movement of the carriage, said leg holders being mounted to pivot about axes transverse to the direction of movement of the carriage and transverse to the pivot axis of the anchoring member, and means operatively associated with said carriage for moving said carriage away from said anchoring member, whereby portions of the legs are severed from the fowl and the leg tendons of the fowl are pulled from the fowl.

9. A machine for pulling leg tendons of fowls comprising an anchoring member, a carriage normally positioned adjacent said anchoring member and movable away from and toward said anchoring member, said anchoring member adapted to have the body of the fowl anchored thereto relative to said carriage, said carriage having a pair of leg holders pivotally mounted thereon, said leg holders and anchoring member having slots therein adapted to be aligned and to receive the leg of a fowl with the feet positioned to one side of the carriage and the body of the fowl positioned on the opposite side of the anchoring member, said anchoring member being mounted to pivot about an axis transverse to the direction of movement of the carriage, said leg holders being mounted to pivot about axes transverse to the direction of movement of the carriage and transverse to the pivot axis of the anchoring member, means operatively associated with said carriage for moving said carriage away from said anchoring member, whereby portions of the legs are severed from the fowl and the leg tendons of the fowl are pulled from the fowl, means limiting the pivoting of said leg holders, means limiting the pivoting of said anchoring member, and resilient means maintaining said leg holders in a position wherein the recesses therein are aligned with the recesses in the anchoring member.

10. A machine for pulling leg tendons of fowl comprising an anchoring member, a carriage normally positioned adjacent said anchoring member and movable away from and toward said anchoring member, said anchoring member adapted to have the body of the fowl anchored thereto relative to said carriage, said carriage having a pair of leg holders pivotally mounted thereon, said leg holders and anchoring member having slots therein adapted to be aligned and to receive the legs of a fowl with the feet positioned to one side of the carriage and the body of the fowl positioned on the opposite side of the anchoring member, and means operatively associated with said carriage for moving said carriage away from said anchoring member, whereby portions of the legs are severed from the fowl and the leg tendons of the fowl are pulled from the fowl, the slots in said anchoring member extending inwardly from one edge of said anchoring member, said anchoring member being pivotally mounted adjacent said one edge, and said leg holders being mounted to pivot about axes transverse to the direction of movement of the carriage and transverse to the pivot axis of the anchoring member, said pivotable anchoring member and pivotable leg holders being operative to break and sever the legs of a fowl thrust into the registering slots of the anchoring member and of the leg holders when the carriage is moved away from said anchoring member.

11. A machine for pulling leg tendons of fowl comprising an anchoring member, a slidably mounted carriage reciprocable toward and away from said anchoring member, said anchoring member adapted to have the body of the fowl anchored thereto relative to said carriage, means on said carriage for receiving and grasping the legs of a fowl, means operatively associated with said carriage for moving said carriage away from said anchoring member, whereby portions of the legs are severed from the fowl and the leg tendons of the fowl are pulled from the fowl, means adapted to be engaged by the moving carriage and operated by said carriage for discharging the severed portions of the legs and tendons from the carriage after the tendons have been pulled.

References Cited in the file of this patent

UNITED STATES PATENTS

| 706,853 | Scannell | Aug. 12, 1902 |
| 732,300 | Hollender | June 30, 1903 |
| 787,025 | Congdon | Apr. 11, 1905 |
| 1,601,077 | MacDonald | Sept. 28, 1926 |
| 2,278,162 | Courlang et al. | Mar. 31, 1942 |

FOREIGN PATENTS

| 12,251 | Great Britain | A. D. 1908 |